UNITED STATES PATENT OFFICE.

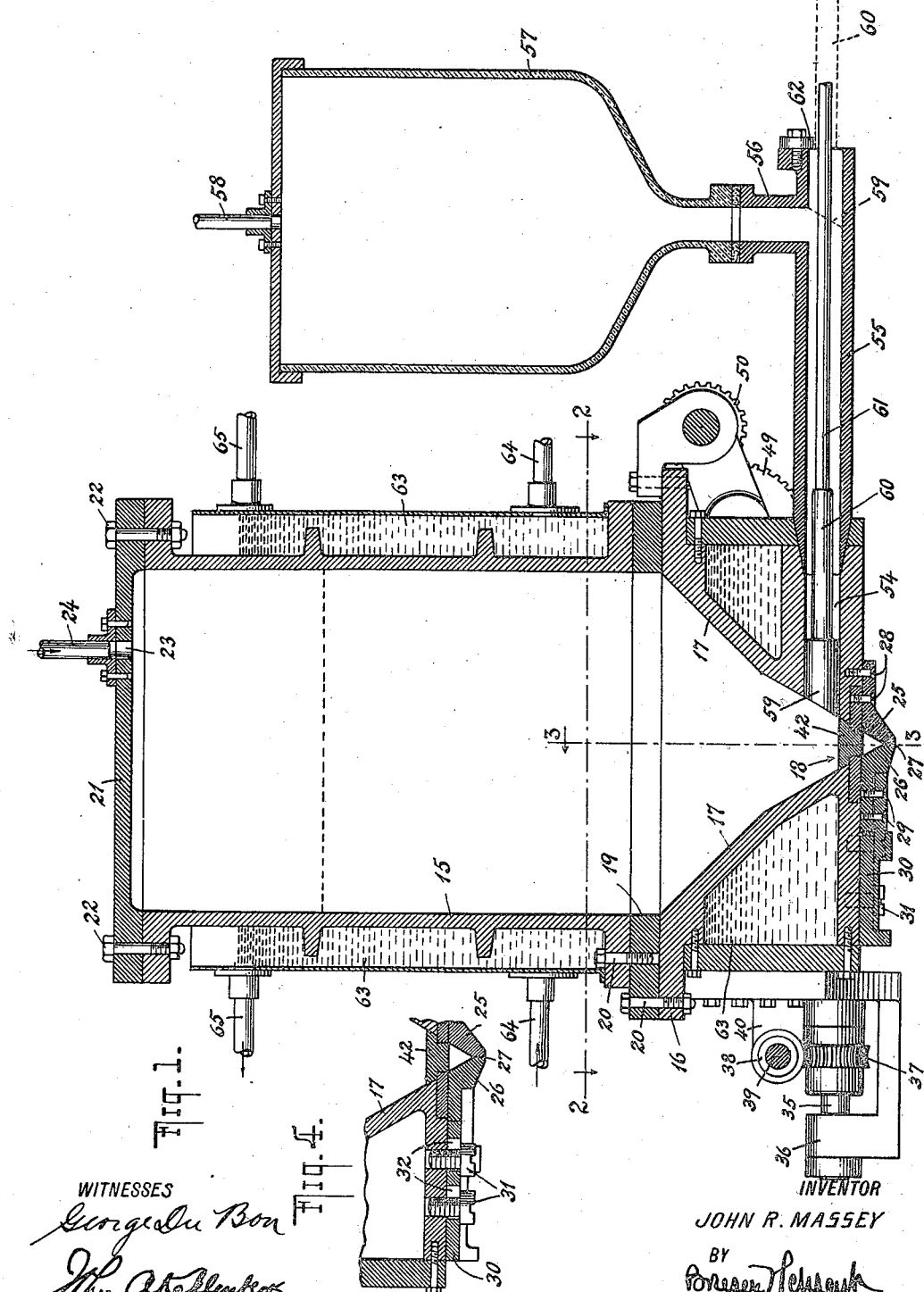

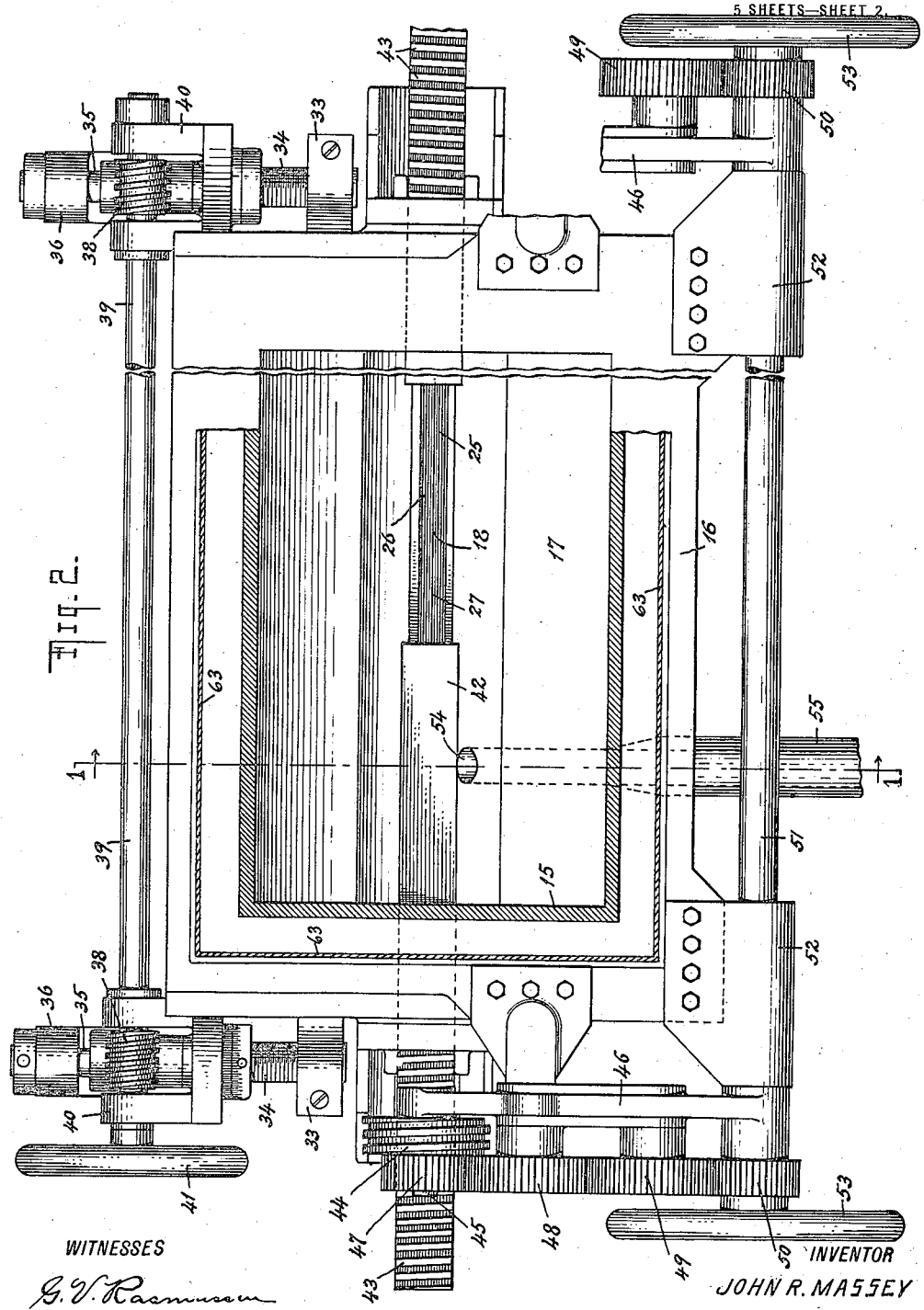

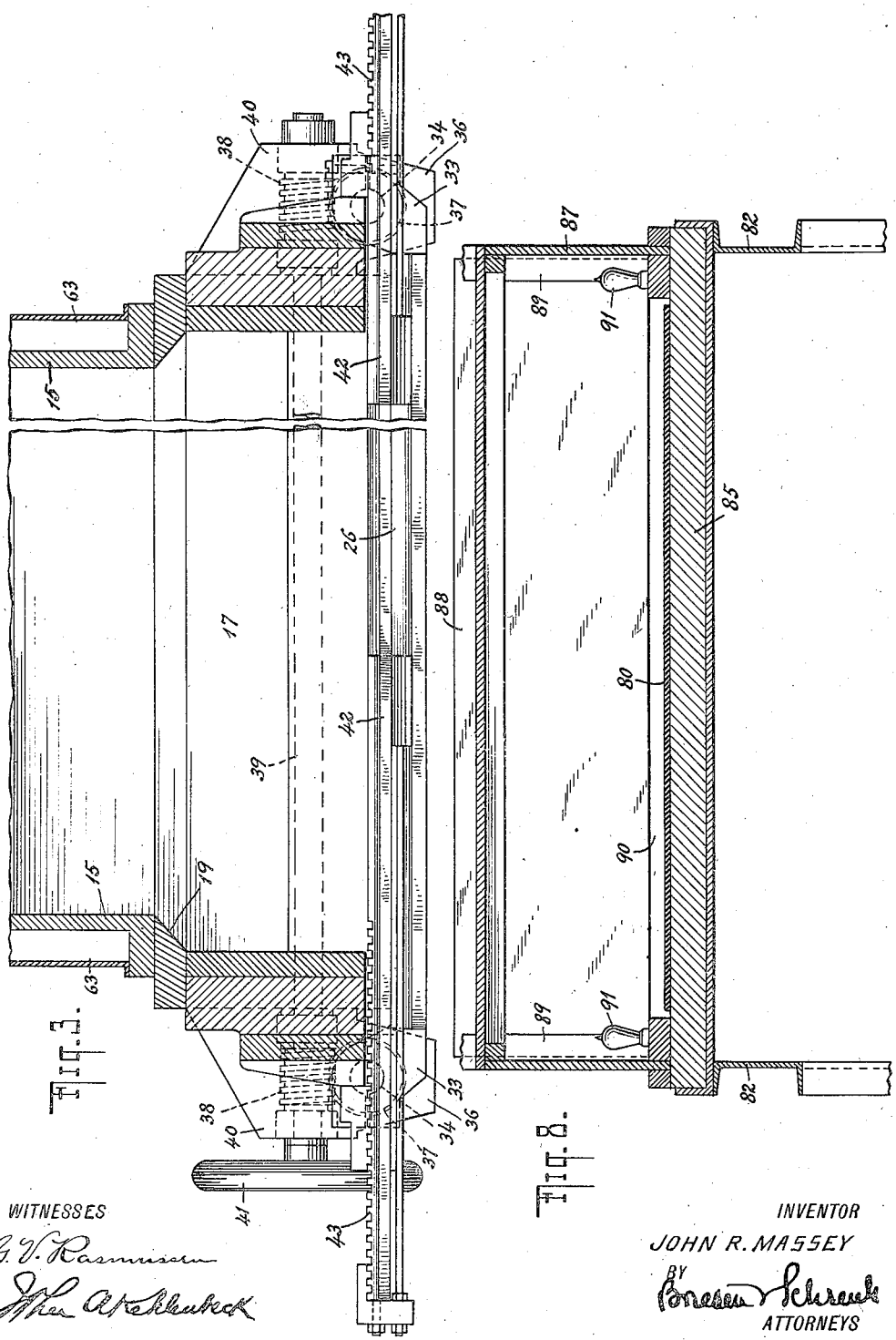

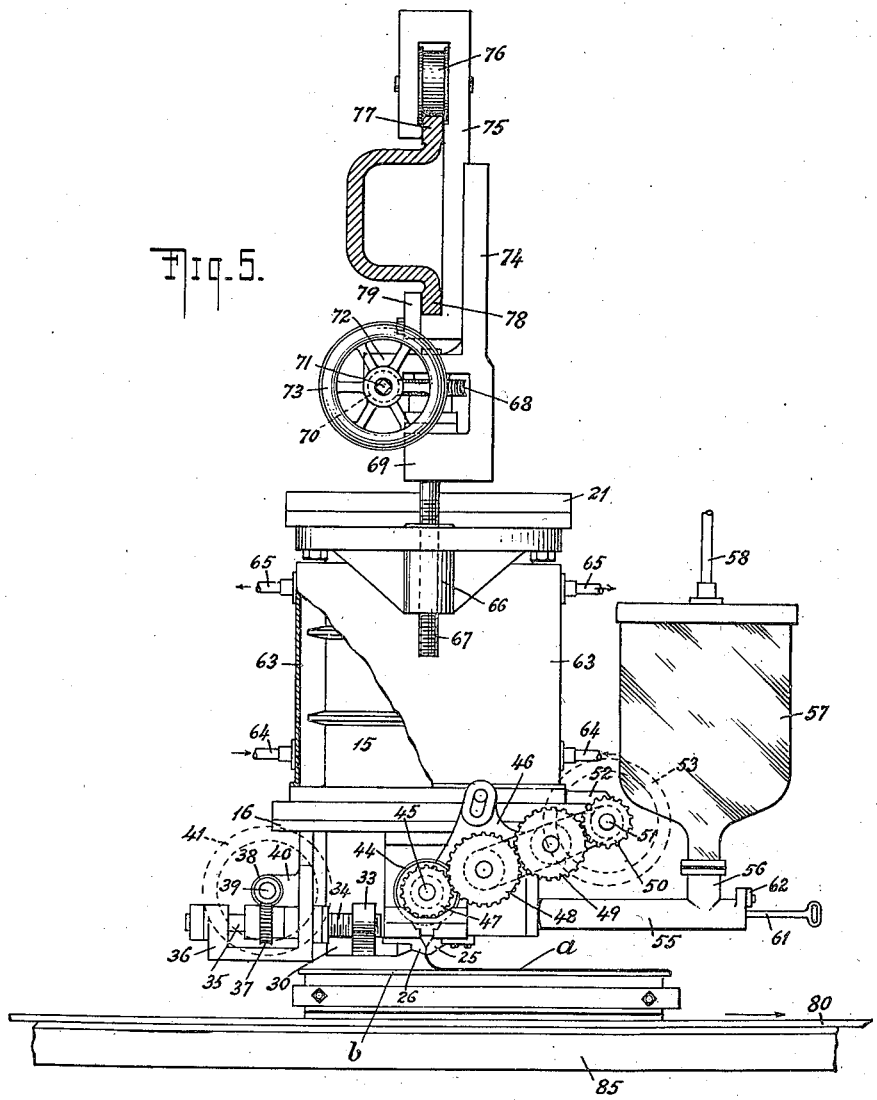

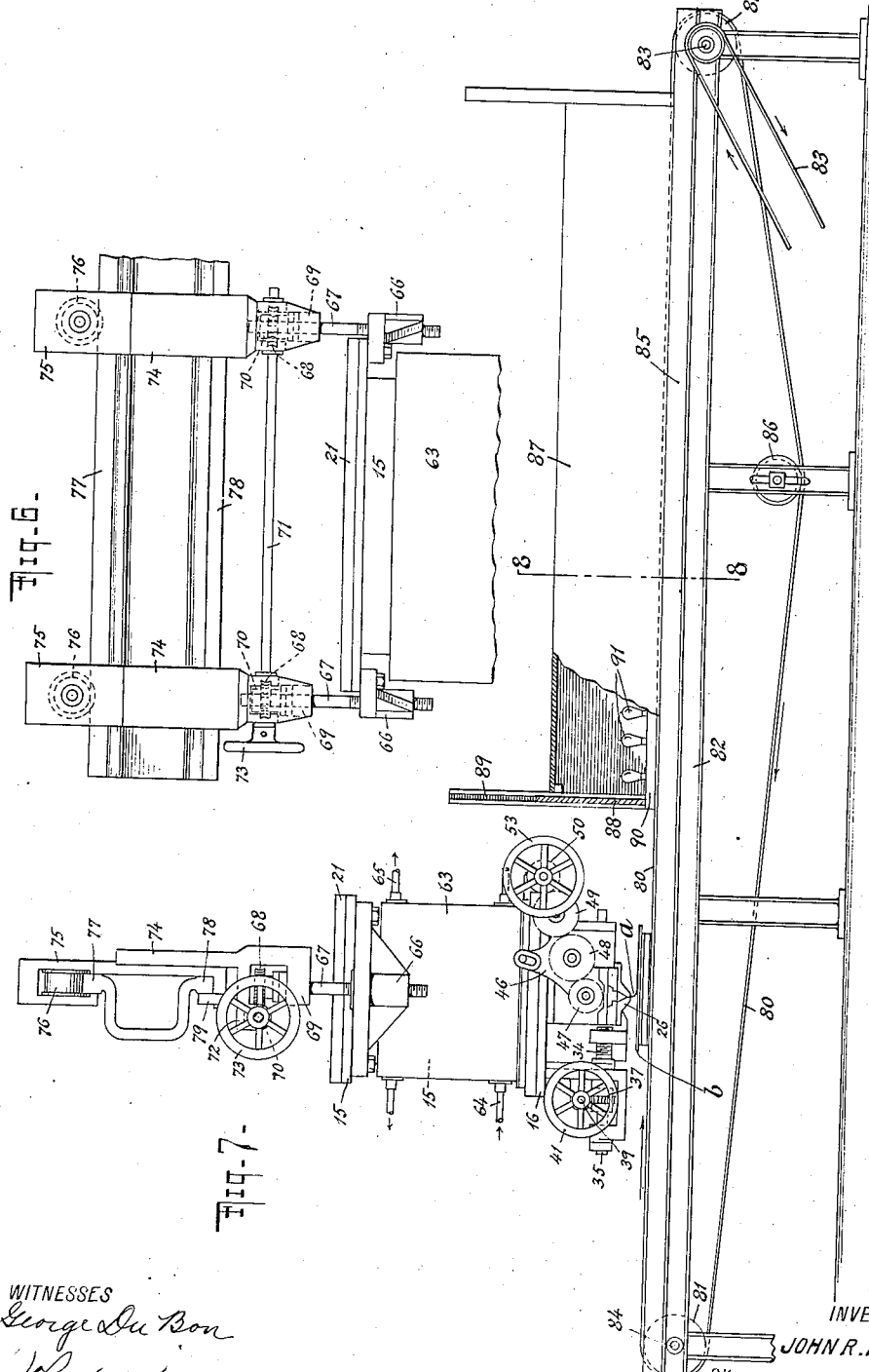

JOHN R. MASSEY, OF NEW BRUNSWICK, NEW JERSEY, ASSIGNOR, BY MESNE ASSIGN-MENTS, TO VITROCELL COMPANY, OF COLUMBUS, OHIO, A COPARTNERSHIP COM-POSED OF WALTER A. JONES, JO. L. KEENER, AND O. S. MARCKWORTH.

COATING-MACHINE.

1,390,367.  Specification of Letters Patent.  Patented Sept. 13, 1921.

Application filed April 12, 1918. Serial No. 228,083.

*To all whom it may concern:*

Be it known that I, JOHN R. MASSEY, a citizen of the United States, and resident of New Brunswick, county of Middlesex, and State of New Jersey, have invented certain new and useful Improvements in Coating-Machines, of which the following is a specification.

My invention relates to machines for mechanically applying coatings of material and has for its object to provide a machine of simple construction whereby the coating material and more particularly coating material of viscous characteristics may be efficiently and automatically applied to an object in the desired and predetermined manner. Other more specific objects of my invention will appear from the description hereinafter and the features of novelty will be pointed out in the appended claims.

In the accompanying drawings which, for the purposes of illustration and description, show an example of my invention, Figure 1 is a sectional elevation on the line 1—1 of Fig. 2; Fig. 2 is a horizontal section on the line 2—2 of Fig. 1; Fig. 3 is a detail sectional view on the line 3—3 of Fig. 1; Fig. 4 is a detail section of the reservoir lip construction of my machine; Fig. 5 is an end elevation partly in section, including supporting devices; Fig. 6 is a detail elevation of the supporting devices; Fig. 7 is an elevation showing an example of how my machine may be used; and Fig. 8 is a detail cross-section on the line 8—8 of Fig. 7.

In its illustrated form, the apparatus comprises an upright container or reservoir, 15, constructed of suitable material and in the desired dimensions and having a lower portion, 16, the inner surfaces of which converge downwardly as indicated at 17, toward the outlet, 18. For the purpose of facilitating the erecting and disassembling of the parts when required, the reservoir, 15, and exit portion, 16, may be constructed as separate units combined in any suitable manner as by means of a packing ring, 19, and bolts, 20. As shown, the reservoir, 15, is provided with a detachable or otherwise movable cover, 21, secured in place, for instance, by means of bolts, 22; when the machine is utilized for applying a coating material of viscous characteristics, it may be desirable to provide the cover 21 with an opening, 23, connected by means of a pipe, 24, with a source of pressure, such as compressed air or the like. At the bottom, in registry with the exit opening, 18, the reservoir, 15, is equipped with lips, 25, and 26, which, together, provide a discharge opening, 27, through which the mass of coating material finally passes from said reservoir in the form of a film. In order that the thickness of the mass as it flows from the reservoir may be accurately controlled to provide the desired film, one or both of the lips, 25, and 26, may be adjustable toward and away from each other. In the preferred arrangement, as illustrated, the lip, 25, is stationary relatively to the lip, 26, and is rigidly secured in position by means of screws or the like, 28, while the lip, 26, is adjustable toward and away from the stationary lip, 25. The adjustability of the lip 26 may be accomplished in any desired manner; for instance, said lip 26 may be fastened, by means of screws, 29, to a slide, 30, slidably mounted upon a lower surface of the portion 16 by means of bolts, 31. The latter pass through slots, 32, in said slide whereby an adjustment thereof, and with it the lip 26, may be had within certain limits. Any suitable mechanism may be utilized for actuating the slide and for maintaining it in any adjusted position. For instance, said slide 30 may be provided at its opposite ends with lugs, 33, having internally screw-threaded apertures for the accommodation of screw-threaded spindles, as shown in Figs. 2 and 5. These spindles, 34, form part of or are carried by shafts, 35, journaled in bearings, 36, suitably located on the portion 16 of the reservoir 15, the shafts, 35, and spindles, 34, being free to rotate but being suitably held against axial movement in said bearings. Each shaft, 35, carries a worm wheel, 37, in mesh with a worm gear, 38, the latter being located upon a shaft, 39, rotatably mounted in bearings, 40, which, as shown, may form integral parts of the bearings, 36, although this is not necessary. The shaft, 39, carries a hand wheel, 41, whereby it is operated to rotate the worm gears, 38, and worm wheels, 37, which thus communicate a rotary motion to the shafts, 35, and cause the screw-threaded spindles, 34, to be rotated in the lugs, 33. As the shafts 35 and spindles 34 are held in the bearings 36 against axial movement, this rotative movement of the spindles, 34, will cause the lugs, 33, to travel lengthwise thereof so that a sliding movement is transmitted to the slide, 30, whereby the lip 26 is moved toward or away from the lip 25 to adjust the width of the opening, 27.

For the purpose of controlling the width of the mass which flows from the discharge opening 27, between the lips, 25 and 26, whereby a film of the desired width is produced, members 42 are provided, said members extending interiorly of the portion 16 of the reservoir 15 so as to control the outlet 18. In the illustrated example, these members 42 are slidably mounted in the portion 16 and project exteriorly thereof, as shown in Figs. 2 and 3, the projecting portions being formed with teeth 43 which mesh with worm gears 44. The latter are carried by short shafts 45 journaled in suitable bearings 46; the shafts also carry toothed pinions 47 which are operatively connected by gears 48 and 49 with pinions, 50, said gears 48 and 49 being also journaled in said bearings 46. In some instances, the members 42 may be coincidentally actuated in which case the pinions 50 are each secured upon a shaft, 51, journaled in bearings 52 and provided at opposite ends with hand wheels, 53; in the preferred construction, as illustrated, the members 42 are independently adjustable in which case at least one of the pinions, 50, with its coöperating hand wheel, 53, is loosely mounted on said shaft 51 or otherwise arranged so as to operate independently of the other pinion 50 and hand wheel 53. In any event, it will be apparent, as the hand wheels 53, or either of them, are operated, that rotative motion will be communicated by means of the pinions, 50, gears 48, 49 and pinions, 47, to the worm gears, 44. The latter in turn through the medium of teeth, 43, will cause the members, 42, to move toward and away from each other, either coincidentally or independently, and thus expose more or less of the exit opening, 18, whereby the width of the mass which flows from the reservoir is accurately regulated to produce the desired film of material. If the members, 42, are independently adjustable, the point at which said mass flows out from the reservoir may also be adjusted, as will be readily apparent.

The coating material may be introduced into the reservoir, 15, in any well known manner; or said material may be caused to enter said reservoir in the special manner illustrated in the drawings. In this case the reservoir, 15, is provided with a channel, 54, which communicates with the lower portion 16, near its lower end, as shown in Fig. 1, the outer end of said channel 54 being internally beveled to receive the tapering end of a tube 55. The latter is formed with an upright branch, 56, with which a jar or other receptacle, 57, containing the particular coating material may be detachably connected, as shown in Fig. 1. If the coating material in question is of a viscous nature, the receptacle 57 may also be connected by means of a pipe 58 with a source of pressure, in order that said material may be completely forced from the receptacle 57 into the reservoir 15. As illustrated in Fig. 1, the communication between the branch, 56, and, consequently, between the jar 57 and the tube 55 may be controlled by a slide valve 59 carried by a stem 60. The latter is connected either permanently or detachably as desired, with a rod 61, which projects exteriorly of the tube, 55, and serves as a means for manipulating the valve, 59, a suitable stop, 62, being provided to arrest the outward movement of said valve, 59, in said tube, 55. With this arrangement the receptacle, 57, containing the mass of coating material, is connected with the branch pipe, 56, after which the valve 59 is moved by means of the rod, 61, from the position shown in full lines in Fig. 1 to the position shown in dotted lines in said figure. With the valve 59 in the outer position, the coating material flows from the receptacle, 57, through the branch tube, 56, tube, 55, and the channel, 54, into the reservoir, 15, at the bottom thereof, and gradually rises therein until the contents of the receptacle, 57, have been received or until the desired level has been reached in the reservoir. In either case the valve, 59, is finally moved back to the position shown in full lines in Fig. 1, in which communication between the interior of the reservoir, 15, and the channel, 54, is cut off. The tube, 55, with the receptacle, 57, may then be removed or permitted to remain as desired. While the mass of material is passing from the receptacle, 57, to the reservoir, 15, pressure may, as before stated, be applied to the surface of the mass in said receptacle so that the entire contents are finally transferred to said reservoir. The described method of transferring the coating material to the bottom of the reservoir obviates the possibility of any air being introduced into the mass during the passage into the reservoir; this is advisable and, in many cases, absolutely necessary in order to prevent injury at a later stage in the proceedings and to prevent the formation of air bubbles which might damage the deposited film. The reciprocation of the valve, 59, may also be utilized to clean the tube, 55, as will be apparent.

In the preferred construction, the reservoir, 15, including the lower portion, 16, thereof, is provided with a water jacket, 63, having inlet pipes, 64, and outlet pipes, 65, and whereby the temperature within said reservoir may be maintained at any desired point.

The apparatus so far described may be supported in any manner suitable for the intended purposes; for instance, as shown in Figs. 5, 6 and 7, the reservoir and its connected parts may be suspended so as to be adjustable in a vertical direction and also in a horizontal, transverse direction. In the illustrated example, the reservoir, 15, is accordingly provided at its opposite ends with brackets, 66, having internally screw-threaded apertures for the accommodation of the screw-threaded, upright rods, 67. These latter carry worm wheels, 68, and are rotatably suspended in bearings, 69, in such a manner as to be incapable of any substantial movement in an axial direction, but so as to be freely rotatable. The worm wheels, 68, are in mesh with worm gears, 70, located upon a shaft, 71, journaled in bearings, 72; and provided with a hand wheel, 73, as shown in Figs. 5 and 7. The bearings, 69 and 72, form part of or are secured to brackets, 74, which in turn are carried by suspending members, 75, provided with rollers, 76, arranged to travel lengthwise of a suitably supported track or rail, 77. In the illustrated example, a second track or rail, 78, depends from the first rail, 77, and coöperates with the members, 75, and projections, 79, to maintain the reservoir, 15, and its connected parts against undue vibration, as shown in Fig. 5.

With this arrangement the reservoir and its connected parts are movable bodily along the rails, 77, and 78, and are also adjustable in a vertical direction by means of the hand wheel, 71, worm gears, 70 and worm wheels, 68.

With the reservoir and its connected parts suspended, as shown and described, the object or element to be coated is moved beneath the apparatus, it being understood that it may sometimes be preferable to move the coating apparatus relatively to the element being coated, the latter in such cases being stationary or also movable, as may be deemed best. In any event, in order to produce uniform and efficient results, it is desirable that the movement either of the element being coated or of the coating apparatus or of both be at a constant, even speed without jerkiness and with as little vibration as possible. Thus, as shown in the drawings, the reservoir 15 may be suspended above and transversely to a movable table or traveling conveyer, 80, in the nature of an endless belt, traveling over suitable pulleys, 81, journaled upon a stationary support, 82. Power is applied in any suitable manner to drive the conveyer, 80, for instance, by means of a belt, 83, and pulley, 84, the arrangement preferably being such as to provide for the accurate control of the speed of travel of said conveyer by the attendant, for instance, through the medium of a variable speed transformer. In order that vibration of the element being coated may be eliminated as far as possible, the upper run of the conveyer, 80, is caused to travel in a horizontal plane in surface engagement with a stationary platform, 85, carried by the support, 82, a tension pulley, 86, being preferably provided for maintaining the conveyer under the desired and proper tension. It may further be desirable to subject the element, after it has been coated by the coating apparatus, to the effects of heat in order to either completely or partly dry or harden the applied coating. In such cases the upper run of the conveyer, 80, after passing beneath the reservoir 15, travels lengthwise of an oven or chamber, 87, which is mounted upon the support 82 and has its opposite open ends preferably controlled by slides, 88, vertically movable in guideways, 89. The arrangement may be such that the downward movement of these slides, 88, is arrested at a distance from the upper run of the conveyer, 80, so as to provide spaces, 90, as shown in Fig. 7. The temperature in the interior of the oven or chamber, 87, may be maintained at the desired point in any suitable manner as by means of incandescent electric bulbs, 91.

In utilizing my improved apparatus, the lips 25 and 26, are adjusted so that the discharge opening, 27, is of a transverse width to provide the desired thickness of coating material in the form of a film $a$, this being accomplished in the present case by moving the lip 26 in the manner hereinbefore described. Either previous or subsequent to this adjustment, the mass of coating material referred to earlier in the description has been introduced into the reservoir, 15, it being understood that the members, 42, completely close the outlet 18 during the introduction of the coating material into the reservoir, 15. In the illustrated example, the desired relative movement between the coating machine and the object or element $b$ to be coated is brought about through the medium of the conveyer, 80, which is set in motion and travels in a horizontal plane beneath the reservoir, 15, at a right angle to the discharge opening, 27. The members, 42, are now adjusted to provide the desired longitudinal width of a film $a$, air or other pressure being applied, if necessary, to the upper surface of the material in the reservoir, 15, through the pipe 24, so as to maintain a constant, even flow through the discharge opening 27. The pressure referred to, if used, is accurately controlled in any suitable manner. The element $b$ to be coated, which may be a piece or sheet of glass, fabric or the like for use in making the wings of aeroplanes, the gas bags of airships, etc., or, in fact, any other object, is placed upon the upper run of the conveyer, 80, in proper position to be carried thereby beneath the material as it flows in the form of a film $a$ from the discharge opening 27. The film $a$ of material will thus be deposited upon the element $b$, it being understood that successive elements $b$ may be placed upon the conveyer so as to successively pass beneath the reservoir 15 and thus receive a coating $a$.

The speed of the conveyer, 80, is such that the film or sheet of material $a$ descending from the discharge opening, 27, after it reaches the element $b$, is drawn forward in such a curve that said film $a$ is laid down upon the surface of said element $b$ without any material strain or stress being exerted upon the film. In this manner the film is uniformly deposited upon the element being coated, without distortion, thus avoiding any injury to or destruction of the surface of the laid film $a$. The flow of the mass may be accurately controlled by the air pressure thereon in the reservoir if said pressure is used, or by adjusting the extent or dimensions of the discharge opening, 27, whereby the film $a$ is at all times efficiently and uniformly laid, this result being further assured because the speed of travel of the conveyer whereby the element being coated is carried beneath said reservoir may be accurately and positively controlled; the adjustments and control referred to may be accurately predetermined according to the class or kind of material being coated.

In the form of apparatus illustrated in Fig. 7, the element $b$ after the film $a$ has been laid thereon, is carried into and through the oven or chamber 87, in which, as previously stated, a predetermined temperature is maintained. As the coated element $b$ is thus carried through this chamber 87, the film $a$ is subjected to the action of the temperature therein and may thus be set or hardened either partly or completely whereby, for instance, running and consequent distortion of the said film is prevented.

As the coated element $b$ reaches the exit end of the chamber 87, it may be removed from the conveyer 80 by an attendant and subjected to final treatment in which the edges may be trimmed, the element cleaned or any such other steps as may be necessary to place the product in a commercial condition and ready for sale and shipment may be performed.

My improved apparatus is simple in construction, efficient and economical in operation and may be utilized for applying many different kinds of coating materials in the form of uniform and perfect films and is particularly adapted for coating glass and materials for use in constructing the wings of aeroplanes and the gas bags of airships and the like.

Various changes in the process and apparatus described and shown may be made within the scope of the claims without departing from the spirit of my invention.

I claim:

1. A coating apparatus of the kind described comprising a reservoir for containing a coating material, said reservoir having an outlet and discharging means adjacent to said outlet whereby the outflowing coating material is formed into a film, the discharge opening of said discharging means extending substantially perpendicular to the surface being coated.

2. A coating apparatus of the kind described comprising a reservoir for containing a coating material and having an outlet, means whereby said outlet is controlled, means independent of said outlet controlling means located adjacent to said outlet for forming the outflowing coating material into a film and means whereby said independent means is adjusted to fixed positions to vary the transverse thickness of the film.

3. A coating apparatus of the kind described comprising a reservoir for containing a coating material and having an outlet, means whereby said outlet is controlled, means independent of said outlet controlling means located adjacent to said outlet for forming the outflowing coating material into a film, means whereby said independent means is adjusted to fixed positions to vary the transverse thickness of the film and means whereby said outlet controlling means is adjusted to selectively open a predetermined portion of said outlet whereby the dimensions of the film as to width are regulated.

4. A coating apparatus of the kind described comprising a reservoir for containing a coating material and having an outlet, means whereby said outlet is controlled, coöperating lips independent of said outlet controlling means located adjacent to said outlet for forming the outflowing coating material into a film and means whereby at least one of said lips is adjusted relatively to the other to fixed positions to vary the transverse thickness of said film.

5. A coating machine of the kind described comprising a reservoir for a coating material having an outlet at its bottom portion and an inlet located in close proximity to said outlet, a source of supply of said coating material connected with said inlet whereby the material is delivered to said reservoir from the bottom up and a valve controlling said inlet.

6. A coating machine of the kind described comprising a reservoir for a coating material, said reservoir having an outlet and an inlet located in close proximity to said outlet, a receptacle containing said material detachably connected with said inlet, a valve controlling said inlet, means for introducing a pressure medium into said receptacle above the material therein, lips adjacent to the reservoir outlet for forming the outflowing material into a film, means for adjusting at least one of said lips whereby the thickness of said film may be regulated, slidable members controlling said outlet, means for adjusting said members whereby the width of said film may be regulated, and means for introducing a pressure medium into said reservoir above the material therein.

7. A coating apparatus of the kind described comprising a reservoir for a coating material having an outlet, lips adjacent to said outlet for forming the outflowing material into a film, means for adjusting at least one of said lips whereby the thickness of said film may be regulated, means for regulating the width of said film, a traveling conveyer for the element to be coated passing beneath said reservoir, means whereby said reservoir may be adjusted vertically toward and away from said conveyer and means whereby said reservoir may be adjusted in a direction transverse to said conveyer.

In testimony whereof I have hereunto set my hand.

JOHN R. MASSEY.